United States Patent
Steen et al.

[11] 3,982,041
[45] Sept. 21, 1976

[54] HERMETICALLY SEALED RICE MIX

[75] Inventors: Gary J. Steen; Terrence A. Bedell, both of Houston; Frank W. Myers, Cleveland, all of Tex.

[73] Assignee: Riviana Foods Inc., Houston, Tex.

[22] Filed: July 1, 1974

[21] Appl. No.: 485,025

[52] U.S. Cl. .............................. 426/618; 426/106; 426/419
[51] Int. Cl.² ......................................... B65D 85/70
[58] Field of Search ........... 426/106, 126, 131, 208, 426/120, 392, 396, 410, 618, 419

[56] References Cited
UNITED STATES PATENTS

| | | | |
|---|---|---|---|
| 444,847 | 1/1891 | Pomeroy | 426/208 |
| 1,090,255 | 3/1914 | Walsh | 426/208 |
| 2,191,509 | 2/1940 | Walsh | 426/131 |
| 2,970,920 | 2/1961 | Forkner | 426/120 |
| 3,000,744 | 4/1961 | Lingelbah | 426/410 X |
| 3,136,449 | 6/1964 | McDowell | 426/131 X |
| 3,488,201 | 1/1970 | Pizarro | 426/126 |
| 3,502,486 | 3/1970 | Lundquist | 426/208 |
| 3,506,447 | 4/1970 | Billerbeck | 426/639 |
| 3,620,762 | 11/1971 | Yoshida | 426/208 |

FOREIGN PATENTS OR APPLICATIONS

| | | | |
|---|---|---|---|
| 42,788 | 1/1970 | Japan | 426/208 |
| 52,324 | 11/1970 | Japan | 426/106 |

OTHER PUBLICATIONS
Nat'l. Can Corp. – Feb. 1942, p. 91.
Food Eng., July 1951, pp. 38, 39, 147.
Food Tech., 25, 723, July, 1971.

Primary Examiner—Robert Halper
Attorney, Agent, or Firm—Delmar L. Sroufe; Frank B. Pugsley; Alan D. Rosenthal

[57] ABSTRACT

A hermetically sealed food system is provided which includes a container, a special low moisture precooked rice, a seasoning ingredient containing a hygroscopic material such as hydrolyzed vegetable protein. The precooked rice component is dried to a low moisture content such that it is rendered sufficiently hygroscopic so that it will prevent any substantial increase in the amount of moisture in the seasoning ingredient.

8 Claims, 2 Drawing Figures

HERMETICALLY SEALED RICE MIX

BACKGROUND OF THE INVENTION

A. Field of the Invention

The present invention relates to a seasoned rice dish or rice mix. Such mixes have been sold as convenience foods in increasing quantities over the last 10 to 15 years. They include a precooked rice together with a mixture of seasoning ingredients. The seasoning mixture may include various components to impart any desired taste or flavor to the finally prepared rice dish.

B. Prior Art

Several product concepts have been attempted which have not proven to be satisfactory and which have not endured in the market place. Among such concepts are coating seasoning elements on the rice and packaging the rice in a transparent film such as polyethylene or celophane. The films have not proven to be adequate moisture and oxygen barriers and excessive loss of flavoring and increasing rancidity have occurred to make the products undesirable. Completely prepared products have been manufactured and distributed as frozen foods. Unfortunately rice tends to retrograde during frozen storage and loses its textural quality. Moreover frozen distribution is expensive and thereby creates an unacceptable cost burden.

A large and successful market has developed in which a quantity of seasoning elements are packaged in a pouch containing polyethylene aluminum foil (generally 0.00035 guage), and paper with a polyethylene coating used to laminate the layers together. The rice is either loosely filled in the carton or in a permeable paper pouch. The rice and seasoning packet are combined in a carton which becomes the unit offered for sale in the retail store. Rice mixes prepared from these rice and seasoning units necessitate the use of two or more preparation vessels in the home (such as a frying pan and a sauce pan) and, depending on the level of processing of the rice, it may require 15 to 30 minutes to prepare the dish.

SUMMARY OF THE INVENTION

It is the discovery of this invention that a seasoned rice mix may be prepared for ambient storage over an extended period of time by providing in a hermetically sealed container a seasoning mix and a precooked rice rendered hygroscopic by lowering its moisture content.

The packaged rice mix of the present invention, comprises a food system in which the ingredients are specially processed and packaged to keep them in a satisfactory condition for an extended period of time. This product concept requires a special low moisture precooked rice having a maximum moisture content generally below about 5%, preferably below about 4% and in any event sufficiently low in moisture to cause the precooked rice to become sufficiently hygroscopic to prevent any substantial increase in moisture in the flavor or seasoning ingredients included in the package. The sealed package will contain in contact with the rice a seasoning mix selected and formulated to provide the desired taste or flavor for the rice dish after it has been prepared for table use. For example, the rice mixture may include Italian style seasoning, beef seasoning, chicken seasoning, or wild rice seasoning.

A characteristic of the seasoning ingredient is that it contains as a component hydrolyzed vegetable protein (HVP) — usually in an amount ranging from about 20% to about 50% and preferably about 25% to about 35% based upon the total weight of the seasoning mixture. The HVP component is very hygroscopic and tends to deteriorate in texture, color and taste if exposed to the atmosphere.

In addition to the precooked rice component and the seasoning mix in the rice mix of the present invention, there may be incorporated a dry starchy food such as a pasta or a dry precooked wild rice. The dried wild rice or starchy food should have a moisture content generally in the range which would be allowable for the precooked rice component.

The preferred concept includes a specially sized aluminum pan as a container for the seasoned rice mix. The pan should have sufficient rigidity to act both as a preparation pan and as a serving dish at the table. It may include external color printing to increase its heat adsorption capability. In a preferred form it has a flanged lip with the smooth surface sufficiently broad to receive flexible foil cover which is hermetically sealed to the flanged lip.

DESCRIPTION OF THE PREFERRED EMBODIMENTS

Figure 1:
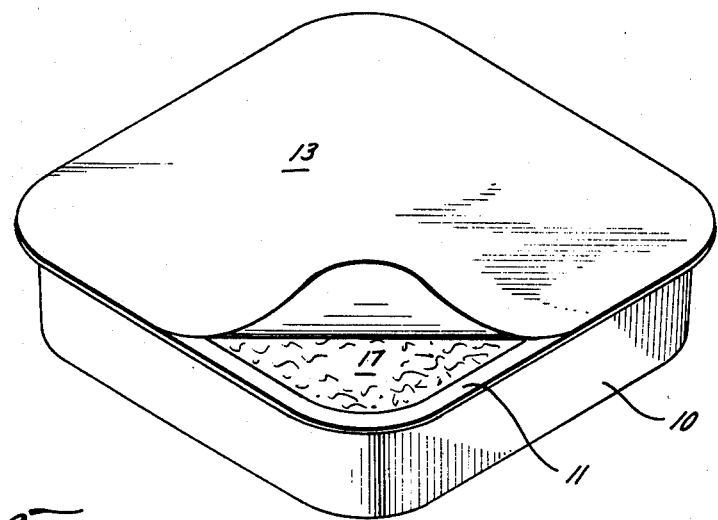
FIG. 1 of the accompanying drawings is a three dimensional projection of the packaged food product of this invention showing the cover partially opened.

The realities of the market place in present day grocery distribution in the United States require food products to withstand transportation, warehousing, display in stores, and a certain amount of holding within the home prior to preparation and serving by the homemaker. Transportation and warehousing aspects may be repeated several times before ultimate consumption. Accordingly, the packaged food system of the present invention is designed to maintain the rice mix for a minimum of 12 months at ambient storage temperatures which will normally vary and may range as high as about 90°F.

Preliminary investigations by the inventors of the rice mix system of this invention indicated that seasoned mixes utilizing as a major component conventional instant rice with from 8 to 10% moisture could not be stored for prolonged periods of time because such seasoning blends rapidly discolored, caked and developed off flavors. Further investigation showed that several ingredients of the seasoning mixes — especially the hydrolyzed vegetable protein components — tended to be extremely hygroscopic in nature so that in a hermetically sealed container they took moisture from the air and from the rice. It was found that any substantial increase in the moisture content of the seasoning mix would within a period of a few weeks storage lead to color changes, flavor changes, and caking thereof. Any or all of these effects could render the formulated food product unacceptable.

It was found that in the seasoned rice mix system of this invention there is a close correlation between significant moisture increases in the seasoning mixture and subsequent production of undesirable flavor, texture and color changes in the seasoning mix. Further it was the surprising discovery of this invention that when precooked rice with a moisture content of below 5% and preferably about 4% was used in the formulation of the products, the rice became sufficiently hygroscopic to protect the seasoning so that the moisture content of the seasoning did not rise substantially and undesirable changes were minimized. This was found to be true even though the moisture content of the precooked specially dried rice was in many cases greater than the moisture content of the seasoning mix.

In a hermetically sealed package containing a seasoning mix and the specially processed low moisture content rice and starchy foods of the present invention, the amount of air and its moisture content is not normally sufficient to noticeably effect the moisture content of the solid materials. Usually the bulk fill of rice and seasoning mix will be about 30–60% of the total interior space in the hermetically sealed container and the small amount of moisture contained in the amount of air accompanying this quantity of rice and seasoning does not materially effect the moisture content of the solid ingredients. However, prolonged exposure to the atmosphere during the filling process should be avoided, and it is presently preferred that the relative humidity of the room in which the containers are filled and sealed should be maintained at about 55 or below.

The hydrolyzed vegetable proteins used in the formation of seasoning ingredients in the seasoned rice mixes of the present invention, are hydrolyzed proteins consisting of amino acid salts commonly available in the industry. These hydrolyzed proteins are approved for food use under Title 21, Section 3.23 and they are available in powder, paste and liquid forms. For the purposes of this invention only dry powder or dry granules may be used.

HVP is produced from various vegetable protein sources, principally wheat gluten, maize gluten and soybean meal. The protein containing material is processed by blending it together with a mineral acid, such as hydrochloric acid, at elevated temperatures to hydrolyze the protein material. The reaction is permitted to proceed until substantially complete hydrolysis of the proteins reduces them to their constituent amino acids. The amino acids are then precipitated from the hydrolyzate and converted to amino acid salts by an adjustment of pH.

In some types of hydrolyzed vegetable protein, as noted in Title 21, Section 3.23 of the Code of Federal Regulations, the hydrolyzed proteins may contain monosodium glutamate. The presence of monosodium glutamate in the hydrolyzed protein ingredient of the present invention is not believed to effect the hydroscopic nature of the hydrolyzed vegetable protein and, accordingly, the selection of hydrogen vegetable protein with or without such monosodium glutamate will depend upon the flavor desired rather than the effect upon the system of the present invention.

It is important that the hydrolyzed vegetable protein utilized in the practice of the present invention be in the dry form with a moisture content below about 6% and preferably between about 2% and about 5%. A satisfactory product is made by spray drying the cooled and neutralized amino acid salts. In a typical process the finely atomized hydrolysate may be dried in as short a time as 3 to 5 seconds. The resulting dry powder is collected in cyclone separators.

The amino acid constituents of the hydrolyzed plant protein may be selected and/or blended to obtain hydrolyzed vegetable protein with a desired flavor such as beef or chicken. In addition other dried flavor ingredients such as one or more of autolyzed yeasts, maltrin, salt, herbs, beef fat, chicken fat, dehydrated vegetables, imitation flavoring, and spices may be admixed with the hydrolyzed vegetable protein to form a seasoning mixture having a particular desired flavor. Depending upon the flavor or taste desired, various mixtures of a selected hydrolyzed vegetable protein of desired flavor, spices, herbs, animal fat, chicken fat and/or imitation flavoring may be used to produce flavors such as beef flavor, chicken flavor, and the like. In a typical formulation of a seasoning mix to be used with a rice or rice mix, the seasoning mix will contain between about 20–50% hydrolyzed vegetable protein and, preferably, about 25–35%.

With proper adjustment of moisture content, any precooked rice product may be used as the rice ingredient in the food system of the present invention. Precooked rice which has been processed to render it quick-cooking is described in various patents, such as, for example, Ozai-Durrani, U.S. Pat. No. 2,438,939, dated Apr. 6, 1948 and Autry et al., U.S. Pat. No. 3,189,462, dated June 15, 1965. The processes of these and other patents describe procedures for making precooked rice. Generally the processes include as a first procedure gellatinizing the raw milled rice by one or more cooking steps, such as immersion cooking and in some cases immersion cooking followed by steam cooking. The gellatinized rice is usually dried to a moisture content of about 7–10% moisture. Regardless of the degree of initial drying, the precooked milled rice will reach an equilibrium moisture content if it is exposed to the atmosphere. Depending upon atmospheric conditions, the moisture content of commercially available precooked rice will range from about 8–12%. To be utilized in the present invention the moisture content of the precooked rice is reduced by suitable means such as hot air drying to about 5% or preferably to about 4%.

The seasoning mix component of the packaged seasoned rice mix incorporates a number of typical ingredients which may be varied in quantity to obtain the desired flavor or taste. In each instance, a number of alternate seasoning ingredients are available for use as desired to obtain any particular variation in flavor desired for the product. In all of the recipes of the present invention a hygroscopic element (usually HVP) is used. As previously noted, a number of blends of HVP are available and may be selected to impart the desired taste of beef, chicken, or vegetable. As a general class, the seasoning mixes of the present invention may be designated as hygroscopic seasoning mixes. Their overall moisture content will be not more than 6% and preferably not more than about 5%.

To obtain a typical hygroscopic seasoning mix with a beef flavor, the following general recipe may be used:

| BEEF FLAVORED SEASONING MIX | |
|---|---|
| Ingredient | Weight Percent |
| HVP | 25–35 |
| Maltrin | 20–40 |
| Salt | 5–20 |
| Sugar | 5–20 |
| Onion powder | 2–10 |
| Beef fat | 0.5–1.5 |

Other ingredients may be used with the above beef flavored seasoning mix by adding one or more additional ingredients such as, caramel color, garlic powder, ground parsley, imitation beef flavor, spices, and flavor potentiators.

A recipe for a typical Italian style seasoning mix which incorporates hygroscopic HVP as an ingredient may be formulated as follows:

| ITALIAN STYLE SEASONING MIX | |
|---|---|
| Ingredient | Weight Percent |
| HVP | 25–35 |
| Minced onion | 15–24 |
| Red and green bell peppers | 5–15 |
| Garlic powder | 2–7 |
| Yeast | 2–7 |
| Salt | 5–20 |
| Sugar | 5–20 |

Other ingredients which have been found to be compatible with the above and which may be used in quantities desired, include white pepper, basil, oregano, dehydrated parsley powder, etc.

A recipe for a typical chicken flavored seasoning mixture is as follows:

| CHICKEN FLAVORED SEASONING MIX | |
|---|---|
| Ingredient | Weight Percent |
| HVP | 25–35 |
| Maltrin | 10–30 |
| Salt | 5–20 |
| Sugar | 5–20 |
| Chicken meat (powdered) | 4–10 |
| Chicken fat | 4–10 |
| Monosodium glutamate | 3–8 |

Other ingredients have been found compatible with the above chicken flavored seasoning mixture and may be added as desired, such as, dehydrated bell pepper powder, dehydrated parsley powder, calcium silicate, garlic powder, powdered turmeric, ground rosemary, etc.

Each of the hygroscopic flavor mixes given above should be considered to be mere examples illustrating the use of the hygroscopic flavor ingredients with other seasoning elements. Since flavor and taste vary with individuals and with market areas it is obvious that variations, substitutions and omissions of the suggested ingredients may be made. For purposes of the present packaged food system, all such possible variations in individual ingredients are contemplated so long as the seasoning mix is hygroscopic in nature because of the inclusion of HVP alone or with other hygroscopic seasoning elements such as yeast.

In selecting the HVP for the various seasoning mixes, it is a matter of taste whether a powder having a strong beef flavor, a HVP powder having a milder flavor resembling that of chicken, or a very mild meaty flavored powder is selected. Obviously for the beef flavored seasoning mix a HVP product having a strong beef flavor will normally be desired.

Seasoned rice mixes formulated for use in the practice of the present invention may be prepared in accordance with the following general recipe:

| | Allowable Percentage Range | Preferred Percentage Range |
|---|---|---|
| Precooked low-moisture rice | 50–95 | 65–85 |
| Low-moisture pasta, e.g. | | |
| toasted vermicelli | 0–20 | 0–12 |
| Hygroscopic seasoning mix | 5–25 | 8–20 |

In some formulations of the seasoned rice mix, wild rice may be incorporated for its distinctive flavor. It has been found that wild rice may be precooked and dried for use in the rice mix system to a moisture content below about 5% moisture, preferably to about 4% moisture, by processes customarily used for processing precooked milled white rice. When used as a component in applicant's rice mix system, wild rice may be used in amounts between 0 and 25%, and preferably between about 10% and about 20% by weight based upon the total net weight of the rice mix.

Other starchy foods such as pasta products may be incorporated in the seasoned rice mix provided each such starchy food is dried to a sufficiently low moisture content — preferably below about 5%. It is not necessary that such products be precooked; however, in a presently preferred embodiment an enriched vermicelli is used. The vermicelli is preferably toasted in dry air at 290°–300°F for approximately 9 minutes to develop a tan color. The toasting process not only dries the vermicelli but it also has the effect of decreasing the time required to reconstitute it for serving as a food.

In the formulation of seasoned rice mixes, a mixture of vitamins and iron may be added. A suitable enrichment mixture is supplied in approximately the following proportions:

| | |
|---|---|
| Thiamine mononitrate | 4.66 parts |
| Niacine | 36.68 parts |
| Ferric orthophosphate | 29.33 parts |
| Food starch (carrier) | 29.33 parts |

In the preparation of compositions for the present invention, the thiamine and mineral enrichment mixture is first coated upon precooked rice particles to form an enrichment premix. Approximately 3.4 parts of the enrichment mixture are coated upon about 96.6 parts of precooked rice to form the enrichment premix.

Figure 2:
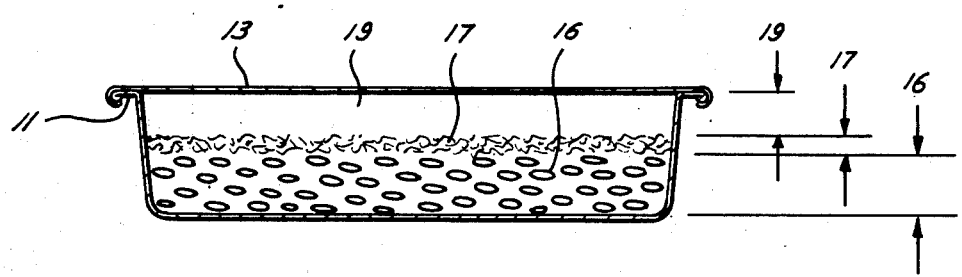
FIG. 2 of the accompanying drawings is a cross-section representation of the packaged food product of FIG. 1.

The seasoned rice mix composition of the present invention is packaged in a hermetically sealed container. Any suitable can or container may be used; however, it is presently preferred that a container such as that illustrated in FIGS. 1 and 2 be utilized. In the drawings, the pan 10 is an impervious metal pan. It is preferably made of aluminum or an aluminum alloy and it is preferably rectangular in shape. The container 10 is provided with outwardly extending sealing flange 11 around its upper periphery.

A rectangular lid 13 of metal foil is provided to extend over the entire top of the pan 10 and to extend beyond flange 11 so that it may be folded around the edge of flange 11 on all sides.

The seasoned rice mix product is assembled in the container by introducing into pan 10 the ingredients of the composition in any desired order. A quantity of low moisture rice 16 is introduced into pan 10 and, if desired, up to about 20% pasta and/or up to about 25% precooked wild rice based upon the total rice mix weight may also be introduced into the pan 10. The hygroscopic seasoning mix 17 is also introduced into container 10, and above the rice and seasoning mix there is a head space 19 which may conveniently range from about 30 to about 60% of the total volume of the container 10. The head space is filled with air or gas, preferably air at no more than 55% relative humidity and desirably about 40% relative humidity. It is important that the lid or closure 13 be impervious and that it be sealed to container 10.

The aluminum metal pan or tray 10 and/or the lid 13 may be coated with plastic material such as polyvinylchloride. By applying a PVC coating upon the container and/or the lid, the PVC may function as a sealing composition that will hermetically seal the lid and flange interface upon the application of heat and pressure. It has been found that a satisfactory seal may be achieved in from 0.2 seconds to 1.0 seconds by applying pressures ranging from about 320 psi to about 5,150 psi as an effective pressure upon the facing contact surfaces. Temperatures for such sealing procedure may be from about 450°F to about 650°F. Other alternative sealing means are known in the food packaging art and any suitable means may be used to render the container of this invention impervious to air and moisture.

A number of accelerated storage tests were conducted to determine the keeping qualities of several seasoned rice mixes held in hermetically sealed containers as described above. In each instance the mixture included enriched instant rice and a seasoning mix. A pasta, e.g., vermicelli with a moisture content of about 4%, was incorporated in many of the seasoned rice mixes. For each recipe, the instant rice ingredient was varied from 4 to 7% moisture to evaluate the effect of variations in moisture upon the keeping quality of the resulting seasoned rice mix.

TESTS OF BEEF FLAVORED SEASONED RICE MIXES

A number of samples of beef flavored seasoned rice mixes were prepared in accordance with the following recipe:

| Ingredient | Percentage |
|---|---|
| Low moisture precooked rice | 75.02 |
| Toasted vermicelli | 8.38 |
| Enrichment premix | 0.42 |
| Beef flavored seasoning mix | 16.18 |
| | 100.00 |

In this group of samples one portion was prepared with precooked rice having a moisture content of 7%; another group of samples was prepared with precooked rice having a moisture content of 6%; another group was prepared with precooked rice having a moisture content of 5%; and a fourth group of samples was prepared having precooked rice with 4% moisture content. In each instance, the beef flavored seasoning mix was prepared in accordance with the formula specified hereinabove and the amount of the HVP ingredient in the hygroscopic beef flavored seasoning mix used for all of these specimens was approximately 29.1% based upon the total weight of the seasoning mix. The initial moisture content of the beef seasoning mixture was 3.9%.

The formulated mixes were packed in hermetically sealed containers and stored at 100°F for periods ranging up to 8 weeks. Sufficient specimens were prepared to allow for testing of a package at the end of each week. Six weeks storage at 100°F has been found to be equivalent to a minimum of 6 months storage under normal storage conditions at ambient temperatures.

Duplicate samples of each moisture level were removed from the environmental chamber and evaluated weekly. The environmental chambers samples were evaluated for:
1. moisture of rice;
2. moisture of seasoning;
3. presence of clumping in the seasoning;
4. visible color changes in the seasoning; and
5. taste of the reconstituted (cooked) product.

The product is reconstituted or prepared for serving by peeling back the tray lid, adding butter or margarine and water, replacing the foil lid by crimping it around the top of the container to minimize evaporation of the water. The container is then placed in a preheated over at 425°F. After about 15 minutes the flavored rice mix is removed, stirred and it is then ready for serving with the rice fully reconstituted and the seasoning ingredients cooked and blended into the mix.

In the beef flavored rice mix, 4¼ ozs. of rice mix is provided in the container. To this amount of rice mix 2 tablespoons of butter or margarine and 1⅓ cups of hot water are added prior to heating the mix in the oven. This amount of water is sufficient to reconstitute the rice mix and the resulting fluffy prepared rice dish contains about four ½ cup servings of the rehydrated and cooked product.

Turning now to the evaluation of the effect of moisture content of the precooked rice in the beef flavored seasoned rice mix, the following test results were noted:

7% moisture — A definite color change and some caking were noted in the seasoning after 3 weeks storage at 100°F. These changes got progressively worse as the study continued and the moisture content of the seasoning increased dramatically after 1 week of storage. The taste of the reconstituted product remained marginally acceptable throughout the study. It was concluded that because of the deterioration in color texture of the seasoning, the product would be commercially unacceptable after about 3 weeks of storage at 100°F.

6% moisture — Definite color changes and some caking occurred in the seasoning after 3 weeks. These changes also got progressively worse as the study continued, and the moisture content of the seasoning increased significantly after one week of storage. The taste of this product remained marginally acceptable throughout the study. It was concluded that at 6% moisture this product would not be commercially acceptable.

5% moisture — There were slight color changes and some minor caking of the seasoning during 8 weeks of storage. There was a slight increase moisture in the seasoning after a week of storage. The taste of the seasoning was found to be acceptable throughout the test period. It was concluded that the beef flavored seasoning mix with precooked rice of 5% moisture content was acceptable for long term storage.

4% moisture — No significant changes were observed throughout the 8 weeks study, and the moisture in the seasoning actually decreased below its initial level and below the moisture level in the rice because of the hygroscopic nature of rice with 4% content.

Tests of the moisture content of the specimens from the study of the above beef flavored rice mixes are set forth in Table I in which the tests of moisture are believed to be accurate to about plus or minus 0.3%.

TABLE I

| BEEF FLAVORED RICE MIX | | | |
|---|---|---|---|
| 4% H₂O Rice | | 5% H₂O Rice | |
| % H₂O Rice | % H₂O Seasoning | % H₂O Rice | % H₂O Seasoning |
| Initial | 4.0 | 3.9 | 5.0 | 3.9 |
| 1st week | 4.1 | 3.3 | 5.4 | 4.5 |
| 2nd week | 4.0 | 3.3 | 5.2 | 4.4 |
| 3rd week | 3.8 | 3.4 | 5.2 | 4.3 |
| 4th week | 3.7 | 3.3 | 5.1 | 4.4 |
| 5th week | 3.7 | 3.2 | 5.3 | 4.2 |
| 6th week | 3.6 | 3.0 | 5.3 | 4.1 |
| 8th week | 4.0 | 3.0 | 5.4 | 4.1 |

| | 6% H₂O Rice | | 7% H₂O Rice | |
|---|---|---|---|---|
| | % H₂O Rice | % H₂O Seasoning | % H₂O Rice | % H₂O Seasoning |
| Initial | 6.0 | 3.9 | 7.0 | 3.9 |
| 1st week | 6.1 | 4.9 | 7.1 | 5.9 |
| 2nd week | 5.7 | 4.9 | 6.8 | 6.1 |
| 3rd week | 5.8 | 4.8 | 6.5 | 5.8 |
| 4th week | 5.8 | 4.7 | 6.9 | 5.9 |
| 5th week | 5.8 | 4.7 | 6.8 | 5.8 |
| 6th week | 5.8 | 4.6 | 6.8 | 5.8 |
| 8th week | Discontinued | Discontinued | | |

It is believed that within the limits of experimental error, the adjustment in moisture of the rice and of the seasoning in the hermetically sealed container occurs within the first week. Thereafter, the variations in moisture content are considered to be due to experimental error rather than any significant changes in the actual moisture content of the rice or the seasoning.

TESTS OF CHICKEN FLAVORED RICE MIXES

A group of test specimens of hermetically sealed rice mixes containing chicken flavored seasoning were prepared. The chicken flavored seasoning was formulated in accord with the general chicken seasoning formula set forth hereinabove. It contained approximately 32.0% HVP selected to have a chicken-type flavor. It also contained 6% dehydrated chicken meat powder and 6% chicken fat.

The chicken flavored rice mix was prepared in accordance with the following recipe:

| Ingredient | Percentage |
|---|---|
| Precooked rice | 76.88 |
| Toasted vermicelli | 8.59 |
| Enrichment premix | 0.43 |
| Chicken flavored seasoning mix | 14.10 |
| Total | 100.00 |

The procedure described for the test of rice mixes containing precooked rice with different moisture content for beef flavored rice mixes was followed for the chicken flavored rice. The initial moisture content of the chicken flavored seasoning mix was 2.5% moisture and the moisture content of the rice was varied from 4% to 7%.

The effect of varying moisture in the rice ingredient was found to be as follows:

7% moisture — A definite color change and caking in the seasoning occurred after 2 weeks of accelerated storage at 100°F. The moisture content of the seasoning increased after 1 week. The taste of the seasoning remained acceptable throughout the weeks of tests; however, because of the marked changes in color and caking the tests were discontinued at the end of the 6th week.

6% moisture — Definite color changes and caking of the seasoning were found after 3 weeks. Moisture of the seasoning increased slightly during storage. Because of marked color changes it was concluded that the rice ingredient with 6% moisture did not produce an acceptable product although the flavor of the seasoning remained acceptable during 6 weeks of accelerated storage.

5% moisture — Color change and caking were noted after 3 weeks; however, the taste of the seasoning remained acceptable over an 8-week period of storage at 100°F and it was concluded that the product would be marginally acceptable even though undesirable changes in color and caking were noted.

4% moisture — No color change or caking occurred in the seasoning mix over an 8-week period of storage at 100°F. The moisture of the seasoning actually dropped from 2.5% moisture to about 1.6 because of the hygroscopic nature of precooked rice having 4% moisture content. The taste of the seasoning remained acceptable throughout 8 weeks of storage and it was concluded that precooked rice with 4% moisture produces a chicken flavored seasoned mix product having satisfactory stability for long term storage at ambient temperatures.

Tests of the moisture content of chicken flavored seasoned rice mixes are set forth in Table II below in which the limits of experimental error in checking moisture are about plus or minus 0.3%.

TABLE II

| CHICKEN FLAVORED RICE MIX | | | |
|---|---|---|---|
| 4% H₂O Rice | | 5% H₂O Rice | |
| % H₂O Rice | % H₂O Seasoning | % H₂O Rice | % H₂O Seasoning |
| Initial | 4.0 | 2.5 | 5.0 | 2.5 |
| 1st week | 4.0 | 1.6 | 5.2 | 2.1 |
| 2nd week | 3.5 | 1.7 | 5.0 | 2.1 |
| 3rd week | 3.8 | 2.4 | 4.9 | 2.4 |
| 4th week | 3.6 | 1.8 | 5.2 | 2.3 |
| 5th week | 3.7 | 1.5 | 5.1 | 2.1 |
| 6th week | 3.8 | 1.4 | 5.2 | 1.9 |
| 8th week | 3.9 | 1.6 | 5.3 | 1.8 |

| | 6% H₂O Rice | | 7% H₂O Rice | |
|---|---|---|---|---|
| | % H₂O Rice | % H₂O Seasoning | % H₂O Rice | % H₂O Seasoning |
| Initial | 6.0 | 2.5 | 7.0 | 2.5 |
| 1st week | 5.9 | 2.6 | 6.9 | 3.8 |
| 2nd week | 5.6 | 3.0 | 6.6 | 4.2 |
| 3rd week | 5.6 | 2.8 | 6.6 | 3.5 |
| 4th week | 5.7 | 2.6 | 6.5 | 3.6 |
| 5th week | 5.7 | 2.5 | 6.7 | 3.3 |
| 6th week | 5.7 | 2.3 | 6.7 | 3.5 |
| 8th week | Discontinued | | Discontinued | |

Preparation of the chicken flavored rice mix for table use is generally the same as the preparation of the beef flavored rice mix. In each instance the tray lid is peeled back and margarine and water are added. The top is then replaced and the tray placed in a preset oven at 425°F for 15 minutes.

TEST OF ITALIAN STYLE RICE MIX

An Italian style seasoning mixture was prepared in accord with the general recipe set forth above. It contained 26.2% HVP selected to have a beef flavor and 3.4% autolyzed yeast. The Italian style rice mix was prepared in accordance with the following recipe:

| Ingredient | | Percentage |
| --- | --- | --- |
| Precooked rice | | 80.46 |
| Toasted vermicelli | | 8.99 |
| Enrichment mix | | 0.45 |
| Italian style seasoning mix | | 10.10 |
| | Total | 100.00 |

As in previous tests, the moisture of the precooked rice ingredient was varied from 4% through 7% to determine the effect of such moisture changes. Tests of the various specimens of the Italian season mix produced the following results:

7% moisture — A slight discoloration and caking of the seasoning was noted during 6 weeks of tests. The taste was marginally acceptable at the end of the 6th week. It was concluded that at 7% moisture undesirable discoloration and caking had occurred but that the product would be deemed marginally acceptable at the end of 6 weeks of storage at 100°F.

6% moisture — There was a slight increase in moisture in the seasoning at the end of 1 week and the seasoning developed some discoloration and caking. The taste of the seasoning remained acceptable and it was concluded that, at the end of 6 weeks of testing, the product would be marginally acceptable.

5% moisture — The moisture content of the seasoning decreased from an initial 4.6% to about 4.1% at the end of 1 week of storage. There were no noticeable changes in the texture or color of the seasoning mix at the end of eight weeks of storage and the taste remained acceptable throughout the test. It was concluded that the use of precooked rice with 5% moisture in preparing the Italian rice mix was satisfactory for long term storage.

4% moisture — It was concluded that the use of precooked rice with 4% moisture produced a product having satisfactory long term storage characteristics with respect to color, texture and flavor.

The preparation of the Italian style rice mix for serving is generally similar to that previously described for the preparation of the beef and chicken flavored rice mixes. However, the Italian style mix is reconstituted by adding 8 ozs. of tomato sauce to 4 ozs. of the Italian rice mix together with 2 tablespoons of butter or margarine and ¾ cup of hot water. The resulting mixture is stirred and the foil lid is replaced over the container and it is then inserted in a preheated oven set at 425°F. After 15 minutes the cover should be removed and the contents stirred. The rice should then be reconstituted and the seasoning ingredients thoroughly cooked and ready for serving.

TESTS OF LONG GRAIN AND WILD RICE FLAVORED RICE MIXES

A group of test specimens were prepared of hermetically sealed rice mixes containing a mixture of specially prepared low moisture precooked milled rice and low moisture precooked wild rice with a flavored seasoning mix formulated to be used therewith. The wild rice seasoning was prepared in accordance with the following general formula in which ranges are approximate.

| WILD RICE SEASONING | |
| --- | --- |
| Ingredients | Percentage |
| HVP | 25–35 |
| Diced minced onion | 10–20 |
| Salt | 10–20 |
| Sugar | 5–15 |
| Monosodium glutamate | 5–13 |
| Garlic powder | 3–10 |
| Torula yeast | 2–10 |
| Autolyzed yeast | 2–10 |

Minor amounts of other ingredients have been found to be compatible with the above for example, dehydrated celery powder, dehydrated mushrooms, vegetable oil, dehydrated parsley granules, powdered sage, ground thyme, ground paprika, soluble red pepper, etc.

A seasoning mixture was prepared in accordance with the above general formula with the principal hygroscopic ingredients present in the following amounts: HVP about 32%, torula yeast about 4% and autolyzed yeast about 4%.

This wild rice seasoning mix was used in the preparation of the following long grain and wild rice mix:

| Ingredient | | Percentage |
| --- | --- | --- |
| Precooked rice | | 69.51 |
| Low moisture precooked wild rice (about 4% moisture) | | 14.32 |
| Enrichment premix | | 0.42 |
| Wild rice seasoning mix | | 15.75 |
| | Total | 100.00 |

The procedure described for the test of rice mixes containing precooked rice with several levels of moisture content utilizing beef flavored rice mixes was followed for the testing of specimens of long grain and wild rice mixes. The initial moisture content of the wild rice seasoning mix was about 4.3% and the moisture content of the precooked rice content of the mix was varied from 4% to 7%.

The effect of varying moisture in the rice ingredient was found to be as follows:

7% moisture — Slight discoloration after 5 weeks storage, and moisture of the seasoning increased significantly after 1 week of storage. It was concluded that the rice mixture containing precooked rice with 7% moisture was not satisfactory for long term storage.

6% moisture — Discoloration was noted after 6 weeks. There was a slight increase in moisture in the seasoning after 1 week of storage. It was concluded that precooked rice with 6% moisture did not produce a satisfactory wild rice seasoned mix because the final product was unacceptable after 6 weeks of storage at 100°F.

5% moisture — The moisture of the seasoning decreased throughout 8 weeks of study and it was concluded that rice with 5% moisture could be used to formulate a wild rice seasoned mix having satisfactory color, flavor and texture characteristics for storage and handling under normal marketing conditions.

4% moisture — The seasoning moisture decreased initially and remained below the initial moisture content throughout the study and color, texture and taste of the seasoning mix were fully satisfactory at the end of 8 weeks of accelerated storage at 100°F.

Preparation of the wild rice mix for table use is generally the same as the preparation of the beef flavored rice mix. In each instance the container for 4¼ oz. mix may be prepared for table use as follows:

1. Preheat oven to 425°F.
2. Remove, and save foil lid. Stir in two tablespoons of butter or margarine and 1⅓ cups of hot water.
3. Replace foil lid (or use a 7-inch square of foil) tightly crimping edges around the top of the container.
4. Bake in oven for 15 minutes at 425°F.
5. Remove covering and stir.

In the practice of this invention, it is presently preferred that all of the ingredients incorporated in the seasoning component be powdered or diced and that the moisture content be maintained below 5% and preferably below about 4%. In many instances, dehydrated herbs may be used in preparing the seasoning mixture for the seasoned rice mixes of this invention.

We claim:

1. A package of seasoned rice mix adapted for storage at ambient temperatures comprising an impervious container; a hygroscopic seasoning mix containing hydrolyzed vegetable protein in an amount between about 20% and about 50% by weight of said hygroscopic seasoning mix; a dry precooked rice, said precooked rice having a moisture content as disposed in the container below about 5%; said dry precooked rice being from about 50% to about 95% of the rice mix net weight and said hygroscopic seasoning mix ranging from about 5% to about 25% of the rice mix net weight; and means hermetically sealing said container with said rice and seasoning mix therein to prevent the entry of moisture into said container.

2. The package of claim 1 wherein a minor proportion of a low moisture starchy food is included with said precooked rice and seasoning material.

3. The package of claim 1 wherein the moisture content of said precooked rice as it is disposed in the container is not more than about 4%.

4. The package of claim 3, wherein the amount of said precooked rice ranges from about 65% to about 85% of the net rice mix weight and the amount of said hygroscopic seasoning mix ranges from about 8% to about 20% of the rice mix net weight.

5. The package of claim 3 wherein the hygroscopic seasoning mix contains hydrolyzed vegetable protein in an amount between about 25% and about 35% of the seasoning mix weight.

6. The package of claim 1 wherein the amount of said precooked rice ranges from about 65% to about 85% of the rice mix net weight and the amount of said hygroscopic seasoning mix ranges from about 8% to about 20% of the rice mix net weight.

7. The package of claim 6, wherein a pasta product is added as an additional ingredient in said container in an amount ranging up to about 20% of the rice mix net weight, said pasta having a moisture content of not more than 5% as disposed in the container.

8. The package of claim 1 wherein the hygroscopic seasoning mix contains hydrolyzed vegetable protein in an amount between about 25% and about 35% of the seasoning mix weight.

* * * * *

UNITED STATES PATENT OFFICE
CERTIFICATE OF CORRECTION

Patent No. 3,982,041　　　　　　　　Dated September 21, 1976

Inventor(s) Gary J. Steen, Terrence A. Bedell, Frank W. Myers

It is certified that error appears in the above-identified patent and that said Letters Patent are hereby corrected as shown below:

Column 1, line 31, "guage" should be -- gauge --

Column 8, line 19, "over" should be -- oven --

Signed and Sealed this

Twenty-third Day of November 1976

[SEAL]

Attest:

RUTH C. MASON
*Attesting Officer*

C. MARSHALL DANN
*Commissioner of Patents and Trademarks*